(12) United States Patent
Yeom et al.

(10) Patent No.: US 12,179,622 B2
(45) Date of Patent: Dec. 31, 2024

(54) BATTERY PACK CHARGING SYSTEM

(71) Applicant: Samsung SDI Co., Ltd., Yongin-si (KR)

(72) Inventors: Gilchoun Yeom, Yongin-si (KR); Hyeoncheol Jeong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 347 days.

(21) Appl. No.: 16/079,723

(22) PCT Filed: Oct. 16, 2017

(86) PCT No.: PCT/KR2017/011360
§ 371 (c)(1),
(2) Date: Aug. 24, 2018

(87) PCT Pub. No.: WO2018/105874
PCT Pub. Date: Jun. 14, 2018

(65) Prior Publication Data
US 2019/0061652 A1 Feb. 28, 2019

(30) Foreign Application Priority Data
Dec. 5, 2016 (KR) .......... 10-2016-0164382

(51) Int. Cl.
*B60L 50/64* (2019.01)
*B60L 53/00* (2019.01)
(Continued)

(52) U.S. Cl.
CPC .............. *B60L 53/62* (2019.02); *B60L 50/64* (2019.02); *B60L 53/00* (2019.02); *B60L 58/12* (2019.02);
(Continued)

(58) Field of Classification Search
CPC .......... H01M 10/4257; H01M 10/425; H01M 2010/4271; H01M 2010/4278
(Continued)

(56) References Cited

U.S. PATENT DOCUMENTS 5,596,258 A * 1/1997 Kimura ............... H02J 7/00036
320/109
5,642,270 A * 6/1997 Green ..................... B60L 53/64
363/17
(Continued)

FOREIGN PATENT DOCUMENTS

CN 102934323 A 2/2013
CN 203942309 U 11/2014
(Continued)

OTHER PUBLICATIONS

EPO Extended Search Report dated May 13, 2020, for corresponding European Patent Application No. 17877898.1 (9 pages).
(Continued)

*Primary Examiner* — Drew A Dunn
*Assistant Examiner* — Pamela J Jeppson
(74) *Attorney, Agent, or Firm* — Lewis Roca Rothgerber Christie LLP

(57) ABSTRACT

Provided is a battery pack charging system including a charging device configured to receive a first signal from a battery pack and determine a charge condition of the battery pack based on the first signal; a battery pack configured to generate the first signal based on a state of charge of the battery pack and transmit the first signal to the charging device; and a controller configured to receive a second signal from the charging device and transmit the second signal to the battery pack.

11 Claims, 4 Drawing Sheets

(51) Int. Cl.
| | |
|---|---|
| *B60L 53/62* | (2019.01) |
| *B60L 58/12* | (2019.01) |
| *B60R 16/03* | (2006.01) |
| *H01M 10/44* | (2006.01) |
| *H01M 50/249* | (2021.01) |
| *H02J 7/00* | (2006.01) |
| *H02J 7/02* | (2016.01) |
| *B60L 53/66* | (2019.01) |
| *H01M 10/42* | (2006.01) |

(52) U.S. Cl.
CPC ............ *B60R 16/03* (2013.01); *H01M 10/44* (2013.01); *H01M 50/249* (2021.01); *H02J 7/00* (2013.01); *H02J 7/007182* (2020.01); *H02J 7/02* (2013.01); *B60L 53/66* (2019.02); *H01M 10/425* (2013.01); *H01M 10/4257* (2013.01); *H01M 2010/4278* (2013.01); *H01M 2220/20* (2013.01); *H02J 7/00036* (2020.01); *H02J 7/0048* (2020.01); *H02J 2310/40* (2020.01); *H02J 2310/46* (2020.01); *H02J 2310/48* (2020.01)

(58) Field of Classification Search
USPC ........................................................ 320/128
See application file for complete search history.

(56) References Cited

U.S. PATENT DOCUMENTS

| | | | | |
|---|---|---|---|---|
| 5,883,493 | A * | 3/1999 | Koenck | H02J 7/00047 320/114 |
| 6,236,186 | B1 * | 5/2001 | Helton | H02J 7/00047 320/106 |
| 6,768,285 | B2 | 7/2004 | James | |
| 7,059,769 | B1 * | 6/2006 | Potega | B60L 58/21 374/185 |
| 7,317,297 | B1 * | 1/2008 | Furlan | H01M 10/425 320/106 |
| 8,222,870 | B2 | 7/2012 | Guo et al. | |
| 8,952,652 | B2 | 2/2015 | Kim et al. | |
| 9,283,861 | B2 | 3/2016 | Han | |
| 10,050,466 | B2 * | 8/2018 | Hu | H02J 7/00714 |
| 10,056,779 | B2 * | 8/2018 | Hu | H02J 7/045 |
| 2002/0000793 | A1 * | 1/2002 | Hanaki | G06F 1/263 323/234 |
| 2003/0085621 | A1 * | 5/2003 | Potega | G06F 1/263 307/18 |
| 2005/0017679 | A1 * | 1/2005 | Tashiro | H02J 7/00038 320/112 |
| 2006/0087286 | A1 * | 4/2006 | Phillips | B25F 5/02 320/114 |
| 2007/0128505 | A9 * | 6/2007 | Yahnker | H01M 10/6235 429/62 |
| 2007/0230227 | A1 * | 10/2007 | Palmer | H02M 1/00 363/78 |
| 2008/0238370 | A1 * | 10/2008 | Carrier | H02J 7/0021 320/134 |
| 2008/0252254 | A1 * | 10/2008 | Osada | H02J 7/042 320/108 |
| 2009/0039833 | A1 * | 2/2009 | Kitagawa | H01M 10/48 320/134 |
| 2010/0085020 | A1 * | 4/2010 | Suzuki | H01M 10/4207 320/157 |
| 2011/0006731 | A1 | 1/2011 | Wang et al. | |
| 2011/0279082 | A1 * | 11/2011 | Hagenmaier, Jr. | B60L 53/62 320/109 |
| 2012/0326667 | A1 * | 12/2012 | Ito | B60L 53/66 320/109 |
| 2013/0069589 | A1 * | 3/2013 | Kai | H02J 7/0042 320/109 |
| 2013/0154355 | A1 * | 6/2013 | An | B60L 15/2045 307/9.1 |
| 2013/0158762 | A1 * | 6/2013 | An | G06F 17/00 701/22 |
| 2013/0214738 | A1 * | 8/2013 | Chen | B60L 58/13 320/109 |
| 2013/0307478 | A1 * | 11/2013 | Boggs | H02J 7/0042 320/112 |
| 2014/0197803 | A1 * | 7/2014 | Ishikawa | H01M 10/46 320/150 |
| 2014/0229129 | A1 * | 8/2014 | Campbell | B60L 50/15 702/63 |
| 2014/0247121 | A1 * | 9/2014 | Satake | B60R 25/40 340/426.11 |
| 2014/0300311 | A1 * | 10/2014 | Caren | H01M 10/425 320/103 |
| 2015/0028810 | A1 * | 1/2015 | Kaindl | H02J 13/00007 320/109 |
| 2015/0180270 | A1 * | 6/2015 | Takano | H02J 50/10 320/103 |
| 2015/0295430 | A1 * | 10/2015 | Wright | B60L 55/00 320/162 |
| 2015/0352967 | A1 * | 12/2015 | Timpf, Jr. | B60L 53/14 320/109 |
| 2016/0036098 | A1 * | 2/2016 | Washiro | H02J 7/0048 429/61 |
| 2016/0059724 | A1 | 3/2016 | Choi | |
| 2016/0101705 | A1 * | 4/2016 | Kuraishi | B60L 53/62 320/109 |
| 2016/0126756 | A1 * | 5/2016 | Okubo | H02J 7/0071 320/107 |
| 2016/0167538 | A1 * | 6/2016 | Kim | H02J 7/0047 320/109 |
| 2016/0190833 | A1 * | 6/2016 | Roumi | H02J 13/00002 320/136 |
| 2016/0288658 | A1 | 10/2016 | Rudolph et al. | |
| 2016/0297311 | A1 * | 10/2016 | Butler | F02N 11/12 |
| 2017/0033338 | A1 * | 2/2017 | O'Hora | H01M 10/6556 |
| 2017/0040810 | A1 * | 2/2017 | Hu | H02J 7/04 |
| 2017/0113563 | A1 * | 4/2017 | Lee | B60L 53/14 |
| 2017/0136885 | A1 * | 5/2017 | Ricci | B60L 53/50 |
| 2017/0136892 | A1 * | 5/2017 | Ricci | H02J 50/20 |
| 2017/0136893 | A1 * | 5/2017 | Ricci | B60L 50/40 |
| 2017/0136894 | A1 * | 5/2017 | Ricci | B60L 50/53 |
| 2017/0138758 | A1 * | 5/2017 | Ricci | B60L 53/53 |
| 2017/0327002 | A1 * | 11/2017 | Lilly | B60L 15/2009 |
| 2018/0123376 | A1 * | 5/2018 | Zhang | H02J 7/0071 |
| 2018/0331561 | A1 * | 11/2018 | Zhang | G01R 31/2874 |
| 2018/0331562 | A1 * | 11/2018 | Zhang | H02J 7/0027 |
| 2018/0331612 | A1 * | 11/2018 | Zhang | H02J 7/00036 |
| 2018/0370376 | A1 * | 12/2018 | Liu | A47L 9/2873 |
| 2021/0210965 | A1 | 7/2021 | Roumi et al. | |

FOREIGN PATENT DOCUMENTS

| | | |
|---|---|---|
| CN | 104868545 A | 8/2015 |
| CN | 105391111 A | 3/2016 |
| CN | 205265301 U | 12/2016 |
| EP | 1892813 A2 | 2/2008 |
| JP | 2009247195 A | 10/2009 |
| JP | 2010-110101 A | 5/2010 |
| JP | 2012-210004 A | 10/2012 |
| JP | 2014-23244 A | 2/2014 |
| JP | 2016-21845 A | 2/2016 |
| KR | 10-2011-0012114 A | 2/2011 |
| KR | 10-2012-0136821 A | 12/2012 |
| KR | 10-1283602 B1 | 7/2013 |
| KR | 10-2013-0102404 A | 9/2013 |
| KR | 10-2014-0118364 A | 10/2014 |
| KR | 10-1480616 B1 | 1/2015 |
| WO | WO1997-008803 A1 | 3/1997 |
| WO | WO2016-100919 A1 | 6/2016 |

OTHER PUBLICATIONS

Office action with English translation issued in related Chinese Application No. 201780025964.3 on May 31, 2021, 18 pages.
Notice of Allowance issued in related KR Patent Application No.

(56) References Cited

OTHER PUBLICATIONS 10-2016-0164382 on Aug. 20, 2021, 2 pages.
Second Office action issued in related Chinese Application No. 201780025964.3 with English translation, Mar. 22, 2022, 13 pages.
Notice of Allowance with English translation issued in CN Patent Application No. 201780025964.3 on Jan. 4, 2023, 8 pages.
Office Action issued in EP Patent Application No. 17877898.1 on Feb. 24, 2023, 5 pages.

* cited by examiner

FIG. 2

| WAVEFORM | DUTY RATIO | EXAMPLE OF WAVEFORM | BATTERY PACK CHARGE STATE | REMARK |
|---|---|---|---|---|
| FIRST WAVEFORM | 0% | | FULL STATE OF CHARGE | |
| SECOND WAVEFORM | 100% | | NON-CHARGEABLE STATE | |
| THIRD WAVEFORM | 12% | 12% | FIRST STATE OF CHARGE | STATE IN WHICH BATTERY PACK IS CHARGED WITH FIRST CURRENT |
| FOURTH WAVEFORM | 38% | 38% | SECOND STATE OF CHARGE | STATE IN WHICH BATTERY PACK IS CHARGED WITH SECOND CURRENT |

BATTERY PACK CHARGING SYSTEM

CROSS-REFERENCE TO RELATED APPLICATION(S)

This application is a National Phase Patent Application of International Patent Application Number PCT/KR2017/011360, filed on Oct. 16, 2017, which claims priority of Korean Patent Application 10-2016-0164382, filed Dec. 5, 2016. The entire contents of both of which are incorporated herein by reference.

TECHNICAL FIELD

The present disclosure relates to a battery pack charging system.

BACKGROUND ART

With the development of electrical energy storage technologies, the types of battery packs installed in mobile devices have gradually diversified.

However, in order to apply a new battery pack to existing wireless devices, related parts of a wireless device and/or charging devices need to be significantly modified.

In particular, in wireless devices using lead-acid battery packs, significant modification of the wireless devices is required to replace existing lead-acid battery packs with lithium-ion battery packs.

DETAILED DESCRIPTION OF THE DISCLOSURE

Technical Problem

Provided is a battery pack charging system which enables use of a lithium-ion battery pack without signification modification of related parts of a wireless device and/or a charging device in a system using an existing lead-acid battery pack.

Also, provided is a battery pack charging system in which a signal including state information of a charging device may be shared by both of a controller of a wireless device and a battery pack.

Technical Solution

According to an aspect of the present disclosure, a battery pack charging system includes a charging device configured to receive a first signal from a battery pack and determine a charge condition of the battery pack based on the first signal, the battery pack configured to generate the first signal based on a state of charge of the battery pack and transmit the first signal to the charging device, and a controller configured to receive a second signal from the charging device and transmit the second signal to the battery pack.

The battery pack may generate the first signal based on the state of charge of the battery pack by a pulse width modulation (PWM) method.

The battery pack may generate the first signal based on a first waveform when the battery pack is in a full state of charge, and generate the first signal based on a second waveform when the battery pack is in a non-chargeable state, the second waveform being different from the first waveform.

When the battery pack is in a first state of charge, the battery pack may generate the first signal based on a third waveform, and when the battery pack is in a second state of charge, the battery pack may generate the first signal based on a fourth waveform, the fourth waveform being different from the third waveform.

The first state of charge may be a state in which the battery pack is chargeable with a first current, the second state of charge may be a state in which the battery pack is chargeable with a second current, and the second current may be greater than or equal to the first current.

The controller may be provided in a vehicle, the battery pack may be provided in the vehicle and is further configured to supply electrical energy to the vehicle, and the charging device may be provided separately from the vehicle.

The controller may convert the second signal received from the charging device according to a controller area network (CAN) communication protocol, and transmit the converted second signal to the battery pack.

The vehicle may include a charging port that electrically connects the charging device to the vehicle, and the charging port may include a first port that electrically connects the battery pack to the charging device, and a second port that electrically connects the controller to the charging device.

The battery pack may transmit the first signal to the charging device through the first port, and the controller may receive the second signal from the charging device through the second port.

The second signal may include information about one or more states of the charging device.

Advantageous Effects of the Disclosure

According to various embodiments of the present disclosure, in a system using an existing lead-acid battery pack, a battery pack charging system capable of using a lithium-ion battery pack without significant modification of related parts of a wireless device and/or a charging device may be implemented.

Furthermore, a battery pack charging system, in which a signal including state information of a charging device may be shared by both of a controller of a wireless device and a battery pack, may be implemented.

DESCRIPTION OF THE DRAWINGS

FIG. 2 illustrates an example of a first signal generated by a PWM method in a battery pack, according to an embodiment of the present disclosure.

BEST MODE

Figure 1:
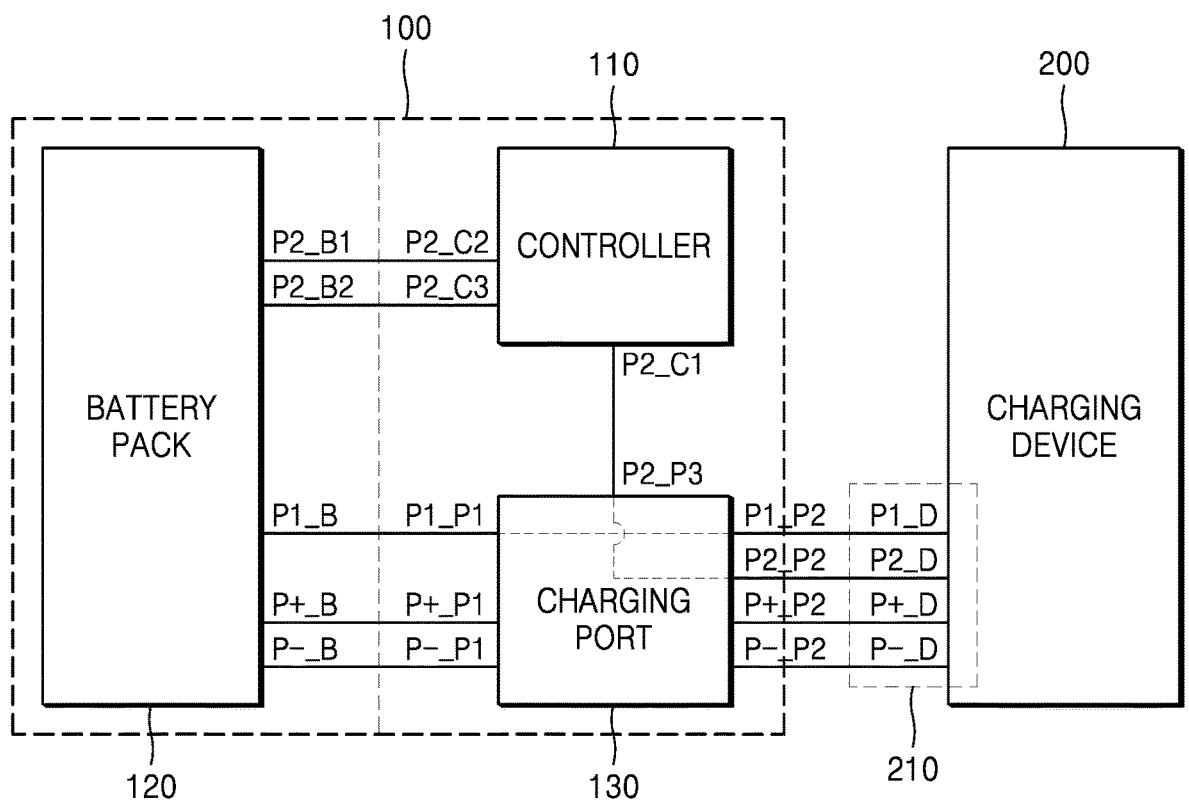
FIG. 1 schematically illustrates a configuration of a battery pack charging system according to an embodiment of the present disclosure.

According to an aspect of the present disclosure, a battery pack charging system includes a charging device configured to receive a first signal from a battery pack and determine a charge condition of the battery pack based on the first signal, a battery pack configured to generate the first signal based on a state of charge of the battery pack and transmit the first signal to the charging device, and a controller configured to receive a second signal from the charging device and transmit the second signal to the battery pack.

Mode of the Disclosure

As the disclosure allows for various changes and numerous embodiments, embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of the related art are omitted when it is deemed that they may unnecessarily obscure the essence of the disclosure.

For example, a particular shape, structure, and characteristics in the present specification may be implemented by being changed from one embodiment to another embodiment without deviating from the spirit and scope of the present disclosure. Furthermore, the position and arrangement of individual constituent element in each embodiment may be understood to be modified without deviating from the spirit and scope of the present disclosure. Accordingly, the below-described detailed description may not be interpreted to be a limiting meaning, and the scope of the present disclosure may be interpreted to comprehend the scope claimed by the claims and all scopes equivalent thereto. In the drawings, similar reference numerals denote the same or similar elements in various aspects. In other words, described particular items are simple examples. Particular implementations may be changed from such exemplary detailed items, and may be continuously considered within the spirit and scope of the present disclosure.

Terms such as "first" and "second" are used herein merely to describe a variety of constituent elements, but the constituent elements are not limited by the terms. Such terms are used only for the purpose of distinguishing one constituent element from another constituent element.

Terms used in the present specification are used for explaining a specific embodiment, not for limiting the present disclosure. Thus, an expression used in a singular form in the present specification also includes the expression in its plural form unless clearly specified otherwise in context. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof. Terms such as "first" and "second" are used herein merely to describe a variety of constituent elements, but the constituent elements are not limited by the terms. Such terms are used only for the purpose of distinguishing one constituent element from another constituent element.

Hereinafter, the present disclosure will be described in detail by explaining embodiments of the disclosure with reference to the attached drawings. Like reference numerals in the drawings denote like elements. Redundant descriptions thereof are omitted.

FIG. 1 schematically illustrates a configuration of a battery pack charging system according to an embodiment of the present disclosure.

Referring to FIG. 1, a battery pack charging system according to an embodiment of the present disclosure may include a charging device 200 and a vehicle 100. The vehicle 100 may include a controller 110, a battery pack 120, and a charging port 130.

The charging device 200 according to an embodiment of the present disclosure may be one of various devices for charging the battery pack 120 by supplying electric power to the battery pack 120 of the vehicle 100.

The charging device 200 according to an embodiment of the present disclosure may receive electric power from a power source and supply the received electric power to the battery pack 120. For example, the charging device 200 may receive electric power from an AC power source such as a system power source and supply the received electric power to the battery pack 120. However, this is exemplary, and the present disclosure is not limited thereto.

The charging device 200 according to an embodiment of the present disclosure may receive a signal (a first signal that is described below) including information about a state of charge of the battery pack 120, from the battery pack 120, and determine a charge condition of the battery pack 120 corresponding to the information. For example, the charging device 200 may receive from the battery pack 120 a signal indicating that the battery pack 120 is completely charged, and accordingly discontinue the supply of electric power to the battery pack 120. Furthermore, the charging device 200 may receive from the battery pack 120 a signal indicating that the battery pack 120 needs pre-charge, and accordingly supply current and/or power corresponding to the pre-charge to the battery pack 120.

The charging device 200 according to an embodiment of the present disclosure may transmit a signal (a second signal described below) including information about one or more states of the charging device 200, to the battery pack 120. For example, the charging device 200 may transmit a signal indicating that the vehicle 100 and the charging device 200 are currently connected to each other, to the battery pack 120. Furthermore, the charging device 200 may transmit a signal including current charging current and/or voltage to the battery pack 120. To this end, the charging device 200 according to an embodiment of the present disclosure may include a communication unit (not shown), a second controller (not shown), and a memory (not shown).

The communication unit of the charging device 200 according to an embodiment of the present disclosure may be a device including hardware and software needed for transceiving a control signal through a wired/wireless connection to a device such as the controller 110 and/or the battery pack 120 of the vehicle 100.

The second controller of the charging device 200 according to an embodiment of the present disclosure may include all types of devices, such as a processor, capable of processing data. A processor may mean, for example, a data processing device embedded in hardware and having a physically structured circuit to perform a function realized by codes or commands included in a program. As such, an example of the data processing device embedded in hardware may include a processor such as a microprocessor, a central processing unit (CPU), a processor core, a multiprocessor, a application-specific integrated circuit (ASIC), or a field programmable gate array (FPGA), but the present disclosure is not limited thereto.

The memory of the charging device 200 according to an embodiment of the present disclosure may perform a function of temporarily or permanently storing data that is processed by the charging device 200. The memory may include a magnetic storage media or a flash storage media, but the present disclosure is not limited thereto.

The charging device 200 according to an embodiment of the present disclosure may include a charge interface 210 connected to the charging port 130 of the vehicle 100. The charge interface 210 may include ports P+_D and P−_D for supplying electric power, a port P1_D for receiving the first signal, and a port P2_D for transmitting the second signal. The ports P+_D and P−_D for supplying electric power may be connected to power ports P+_P2 and P−_P2 of the charging port 130. The port P1_D for receiving the first signal may be connected to a port P1_P2 for transmitting the first signal of the charging port 130. The port P2_D for transmitting the second signal may be connected to a port P2_P2 for transmitting the first signal of the charging port 130.

In the present disclosure, "a port A and a port B are connected to each other" may signify that the port A and the port B are electrically connected to each other.

The vehicle 100 according to an embodiment of the present disclosure may be a vehicle driven by using electricity. For example, the vehicle 100 may be a car that is driven by receiving electric power from the battery pack 120 that is charged and driving a motor. Furthermore, the vehicle 100 may be a hybrid car driven by a motor that receives electric power from the battery pack 120, or by an internal combustion engine that is driven by using fuel, according to a condition. As such, the vehicle 100 according to the present disclosure may mean all vehicles that are driven by using electric power of a battery pack at at least a moment.

The vehicle 100 according to an embodiment of the present disclosure may include, as described above, the controller 110, the battery pack 120, and the charging port 130.

First, the controller 110 according to an embodiment of the present disclosure may include all types of devices capable of processing data like a processor that performs driving control, drive control, and charge control of the vehicle 100. A processor may mean, for example, a data processing device embedded in hardware and having a physically structured circuit to perform a function realized by codes or commands included in a program. As such, an example of the data processing device embedded in hardware may include a processor such as a microprocessor, a CPU, a processor core, a multiprocessor, an ASIC, or a FPGA, but the present disclosure is not limited thereto.

Accordingly, the controller 110 according to an embodiment may receive a signal (second signal) including information about one or more states of the charging device 200 from the charging device 200, and transmit the received signal to the battery pack 120, as part of the charge control. In this regard, the controller 110 according to an embodiment of the present disclosure may convert the second signal according to a controller area network (CAN) communication protocol, and transmit a converted second signal to the battery pack 120.

To this end, according to an embodiment of the present disclosure, a port P2_C1 for receiving the second signal of the controller 110 and a port P2_P3 for transmitting the second signal of the charging port 130 may be connected to each other. Furthermore the controller 110 according to an embodiment of the present disclosure may be connected to the battery pack 120 according to a CAN network protocol. In other words, CAN H ports (a port P2_C2 of the controller 110 and a port P2_B1 of the battery pack 120) and CAN L ports (a port P2_C3 of the controller 110 and a port P2_B2 of the battery pack 120) of the controller 110 and the battery pack 120 may be connected to each other.

Accordingly, in the battery pack charging system according to an embodiment of the present disclosure, a signal including the state information of the charging device 200 may be transmitted to both of the controller 110 and the battery pack 120. Furthermore, since the controller 110 according to an embodiment of the present disclosure converts the second signal according to the CAN communication protocol and transmits the converted signal to the battery pack 120, the second signal may be shared without signification modification of the battery pack 120 and/or the controller 110.

The battery pack 120 according to an embodiment of the present disclosure is a portion for storing electric power and may include a rechargeable unit battery. In this regard, a unit battery may include, for example, a lithium-ion battery or a lithium polymer battery, but the present disclosure is not limited thereto.

The battery pack 120 according to an embodiment of the present disclosure may include one or more unit batteries. In this regard, the battery pack 120 may include one unit battery or a plurality of unit batteries. In this regard, the unit batteries may be connected to each other in series, in parallel, or by a combination of serial and parallel connections. The number and connection type of the unit batteries included in the battery pack 120 may be determined depending on desired output voltage and electric power storage capacity.

The battery pack 120 according to an embodiment of the present disclosure may include a battery management module for managing the above-described unit battery. In this regard, the battery management module may determine whether one or more unit batteries work well and perform various operations according to a result of the determination.

The battery management module may perform an overcharge protection function, an overdischarge protection function, an overcurrent protection function, an overvoltage protection function, an overheat protection function, or a cell balancing function. Furthermore, the battery management module may determine whether one or more unit batteries work well by checking a current, a voltage, a temperature, a remaining electric power amount, life, or a state of charge (SOC) of the unit batteries. For example, the battery management module may measure cell voltages and temperatures of one or more unit batteries by using sensors.

The battery management module according to an embodiment of the present disclosure may include all types of devices capable of processing data like a processor. Since the processor is described above, a description thereof is omitted.

The battery management module according to an embodiment of the present disclosure may generate the first signal based on the state of charge of one or more unit batteries and transmit the generated signal to the charging device 200. In this regard, the first signal may be a signal including information about the state of charge of the battery pack 120, as described above.

The battery management module according to an embodiment of the present disclosure may generate the first signal in various methods. For example, the battery management module according to an embodiment may generate the first signal based on the state of charge of one or more unit batteries by a pulse width modulation (PWM).

FIG. 2 illustrates an example of the first signal generated by the PWM method in the battery pack 120 according to an embodiment of the present disclosure.

The battery pack 120 according to an embodiment of the present disclosure may generate a first signal based on a first waveform when the battery pack 120 is in a full state of charge. Similarly, the battery pack 120 may generate a first signal based on a second waveform, which is different from the first waveform, when the battery pack 120 is in a non-chargeable state.

Furthermore, the battery pack 120 according to an embodiment of the present disclosure may generate a first signal based on a third waveform when the battery pack 120 is in a first state of charge, and generate a first signal based on a fourth waveform, which is different from the third waveform, when the battery pack 120 is in a second state of charge.

In this regard, the above-described first state of charge may be a state in which the battery pack 120 is chargeable with a first current (for example, a state needing pre charge), and the second state of charge may be a state in which the battery pack 120 is chargeable with a second current (for example, a state needing normal charge). The second current may be greater than or equal to the first current.

In other words, as the battery pack 120 according to an embodiment adjusts the width of a pulse included in the first signal according to the state of the battery pack 120, the charging device 200 may check the state of the battery pack 120.

However, the above-described types and specific forms of waveforms are exemplary, and thus the present disclosure is not limited thereto. The types and specific forms of waveforms may vary according to a variety of pieces of information to be transmitted by the battery pack 120 to the charging device 200.

To transmit the first signal generated by the above-described method to the charging device 200, the battery pack 120 according to an embodiment of the present disclosure may be electrically connected to the charging port 130. The charging port 130 may be electrically connected to the charging device 200 to transmit the first signal. In detail, a port P1_B for transmitting the first signal of the battery pack 120 may be connected to a port P1_P1 for transmitting the first signal of the charging port 130, and the port P1_P2 for transmitting the first signal of the charging port 130 may be connected to the port P1_D for receiving the first signal of the charging device 200.

Figure 3:
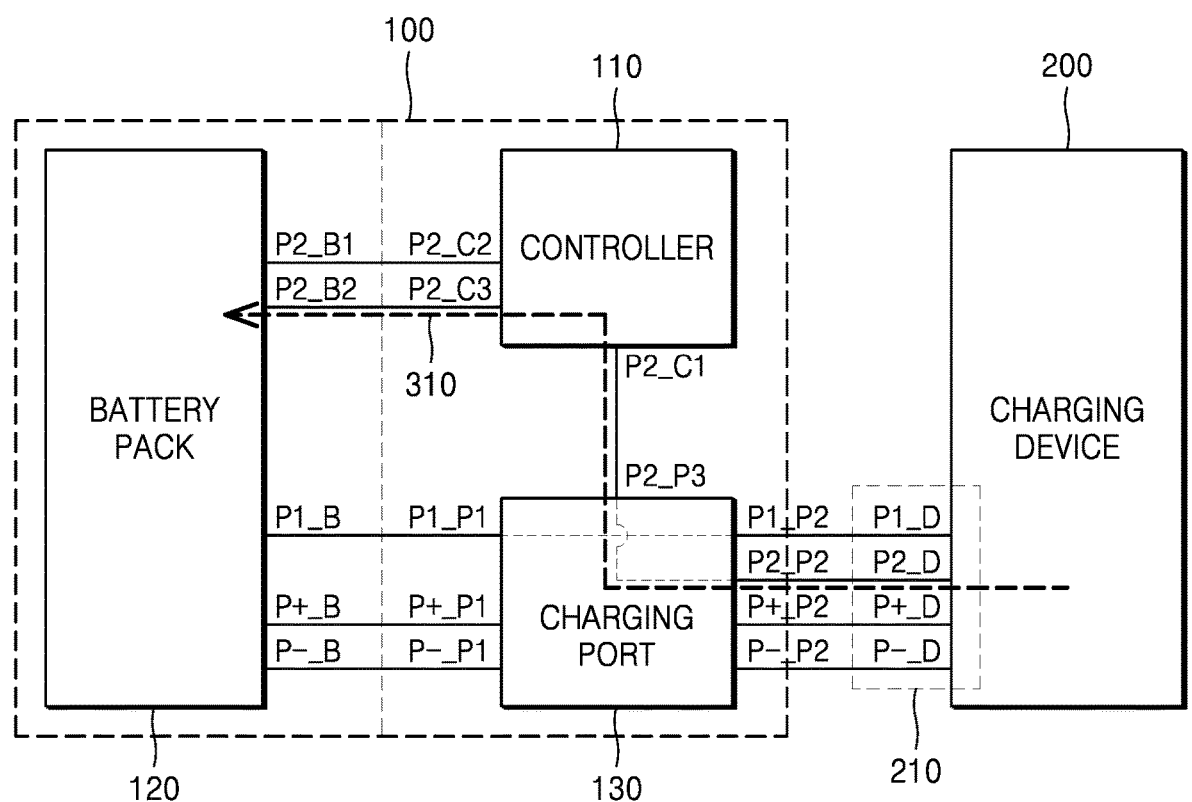
FIG. 3 is a block diagram illustrating a process in which a second signal is transmitted from a charging device to a battery pack, according to an embodiment of the present disclosure.

FIG. 3 is a block diagram illustrating a process in which a second signal is transmitted from the charging device 200 to the battery pack 120, according to an embodiment of the present disclosure.

As described above, the charging device 200 according to an embodiment of the present disclosure may transmit a signal (second signal) including information about one or more states of the charging device 200 to the battery pack 120. Furthermore, the port P2_D for transmitting the second signal of the charging device 200 may be connected to the port P2_P2 for transmitting the first signal of the charging port 130. The port P2_P3 for transmitting the second signal of the charging port 130 and the port P2_C1 for receiving the second signal of the controller 110 may be connected to each other. The CAN H ports (the port P2_C2 of the controller 110 and the port P2_B1 of the battery pack 120) and the CAN L ports (the port P2_C3 of the controller 110 and the port P2_B2 of the battery pack 120) of the controller 110 and the battery pack 120 may be connected to each other.

Accordingly, the second signal that is generated by the charging device 200 based on the information about one or more states of the charging device 200 may be transmitted to the battery pack 120 along a path 310 from the charging device 200 to the battery pack 120 via the charging port 130, the controller 110.

Accordingly, the battery pack charging system according to an embodiment of the present disclosure may transmit the signal including information about the state of the charging device 200 to both of the controller 110 and the battery pack 120. Furthermore, as the controller 110 according to an embodiment of the present disclosure transmit the second signal to the battery pack 120 by converting the second signal according to the CAN communication protocol, the second signal may be shared without signification modification of the battery pack 120 and/or the controller 110.

Figure 4:
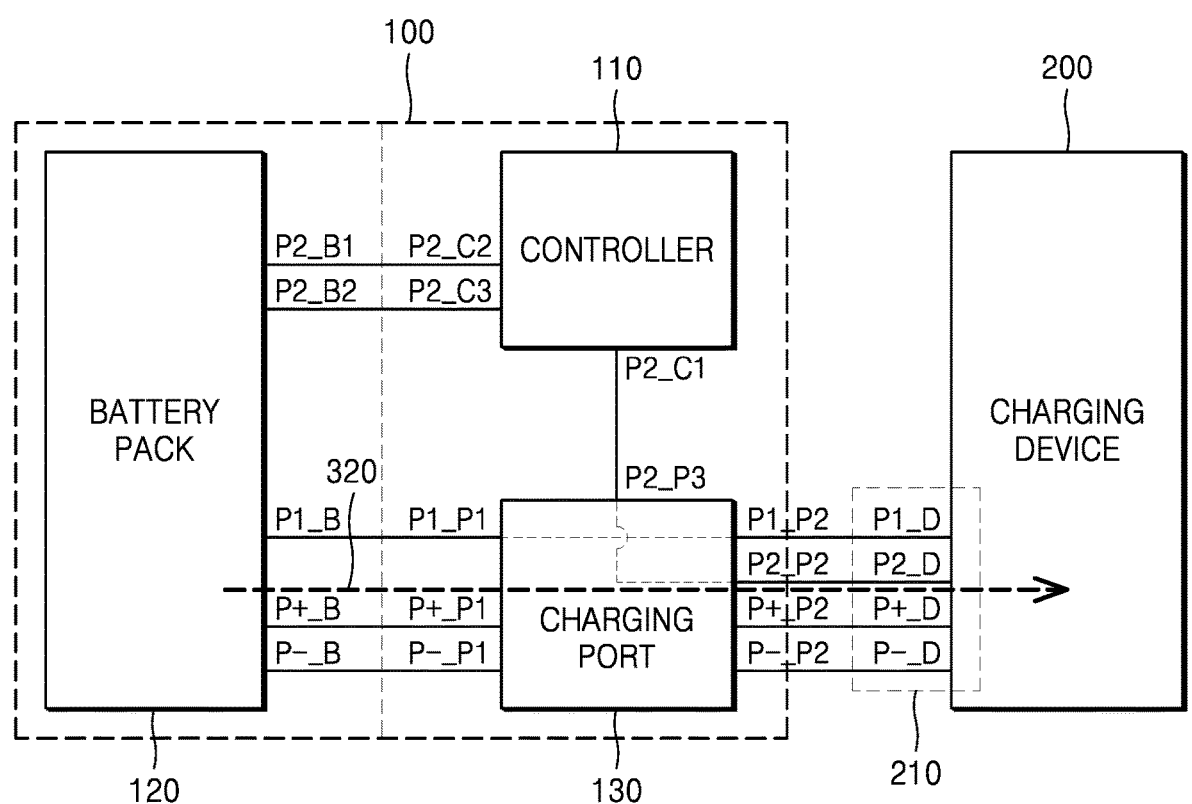
FIG. 4 is a block diagram illustrating a process in which a first signal is transmitted from a battery pack to a charging device, according to an embodiment of the present disclosure.

FIG. 4 is a block diagram illustrating a process in which the first signal is transmitted from the battery pack 120 to the charging device 200, according to an embodiment of the present disclosure.

As described above, the battery pack 120 according to an embodiment may generate the first signal based on the state of charge of the battery pack 120 by the PWM method.

For example, the battery pack 120 according to an embodiment of the present disclosure may generate a first signal based on a first waveform when the battery pack 120 is in a full state of charge. Similarly, the battery pack 120 may generate a first signal based on a second waveform, which is different from the first waveform, when the battery pack 120 is in a non-chargeable state.

Furthermore, the battery pack 120 according to an embodiment of the present disclosure may generate a first signal based on a third waveform when the battery pack 120 is in a first state of charge, and generate a first signal based on a fourth waveform, which is different from the third waveform, when the battery pack 120 is in a second state of charge. In this regard, the above-described first state of charge may be a state in which the battery pack 120 is chargeable with a first current (for example, a state needing pre charge), and the second state of charge may be a state in which the battery pack 120 is chargeable with a second current (for example, a state needing normal charge). The second current may be greater than or equal to the first current.

In other words, as the battery pack 120 according to an embodiment adjusts the width of a pulse included in the first signal according to the state of the battery pack 120, the charging device 200 may check the state of the battery pack 120.

However, the above-described types and specific forms of waveforms are exemplary, and thus the present disclosure is not limited thereto. The types and specific forms of waveforms may vary according to a variety of pieces of information to be transmitted by the battery pack 120 to the charging device 200.

To transmit the first signal generated by the above-described method to the charging device 200, the battery pack 120 according to an embodiment of the present disclosure may be electrically connected to the charging port 130. The charging port 130 may be electrically connected to the charging device 200 to transmit the first signal. In detail, the port P1_B for transmitting the first signal of the battery pack 120 may be connected to the port P1_P1 for transmitting the first signal of the charging port 130, and the port P1_P2 for transmitting the first signal of the charging port 130 may be connected to the port P1_D for receiving the first signal of the charging device 200.

Accordingly, the first signal that is generated by the battery pack 120 based on the state of charge of the battery pack 120 may be transmitted to the charging device 200 along a path 320 from the battery pack 120 to the charging device 200 via the charging port 130.

As such, the battery pack 120 according to an embodiment of the present disclosure may transmit the state of charge to the charging device 200, and thus appropriately control the charging device 200 for charging the battery pack 120.

While this disclosure has been particularly shown and described with reference to preferred embodiments thereof, it will be understood by those of ordinary skill in the art that various changes in form and details may be made therein without departing from the spirit and scope of the disclosure as defined by the appended claims. The preferred embodiments should be considered in descriptive sense only and not for purposes of limitation. Therefore, the scope of the disclosure is defined not by the detailed description of the disclosure but by the appended claims, and all differences within the scope will be construed as being included in the present disclosure.

The invention claimed is:

1. A battery pack charging system comprising:
a charging device configured to receive a first signal from a battery pack and determine a charge condition of the battery pack based on the first signal;
the battery pack configured to generate the first signal having a waveform based on a state of charge of the battery pack and transmit the first signal to the charging device; and
a controller separated from the charging device and from the battery pack, comprising a first controller port electrically coupled to the charging device and a second controller port different from the first controller port and electrically coupled to the battery pack, electrically coupled between the charging device and the battery pack via the first and second controller ports, and configured to receive, via the first controller port, a second signal comprising information about a state of the charging device from the charging device and transmit, via the second controller port, the second signal to the battery pack,
wherein the state of the charging device is a current state of the charging device,
wherein the information about the current state of the charging device comprises information related to at least one selected from current charging voltage and current charging current,
wherein the controller is provided in a vehicle, the battery pack is provided in the vehicle and is further configured to supply electrical energy to the vehicle, and the charging device is provided separately from the vehicle,
wherein the vehicle comprises a charging port to electrically connect the charging device to the vehicle,
wherein the charging port comprises:
a first port to electrically connect the battery pack to the charging device; and
a second port to electrically connect the controller to the charging device,
wherein the battery pack is to transmit the first signal to the charging device through the first port, and
wherein the controller is to receive the second signal from the charging device through the second port.

2. The battery pack charging system of claim 1, wherein the battery pack generates the first signal based on the state of charge of the battery pack by a pulse width modulation (PWM) method.

3. The battery pack charging system of claim 2, wherein the battery pack generates the first signal based on a first waveform when the battery pack is in a full state of charge, and generates the first signal based on a second waveform when the battery pack is in a non-chargeable state, the second waveform being different from the first waveform.

4. The battery pack charging system of claim 2, wherein, when the battery pack is in a first state of charge, the battery pack generates the first signal based on a third waveform, and when the battery pack is in a second state of charge, the battery pack generates the first signal based on a fourth waveform, the fourth waveform being different from the third waveform.

5. The battery pack charging system of claim 4, wherein the first state of charge is a state in which the battery pack is chargeable with a first current,
the second state of charge is a state in which the battery pack is chargeable with a second current, and
the second current is greater than or equal to the first current.

6. The battery pack charging system of claim 1, wherein the controller converts the second signal received from the charging device according to a controller area network (CAN) communication protocol, and transmits the converted second signal to the battery pack.

7. The battery pack charging system of claim 1, wherein the second signal comprises information about a plurality of states of the charging device.

8. The battery pack charging system of claim 1, wherein the charging device is further configured to determine the charge condition of the battery pack based on the waveform of the first signal.

9. The battery pack charging system of claim 1,
wherein the information about the state of the charging device comprises information of whether the charging device is connected to the vehicle.

10. The battery pack charging system of claim 1, wherein the battery pack comprises a battery management module configured to generate and transmit the first signal to the charging device.

11. The battery pack charging system of claim 1, wherein the battery pack is to transmit the first signal to the charging device along a first path separated from the controller.

* * * * *